United States Patent
Kuo et al.

(10) Patent No.: US 6,845,511 B2
(45) Date of Patent: Jan. 18, 2005

(54) REED-TYPE CLAMP DEVICE

(75) Inventors: Tsung-Jung Kuo, Taipei (TW);
Cheng-Fu Li, Taipei (TW);
Ying-Shuen Li, Taipei (TW);
Cheng-Chung Hsu, Taipei (TW)

(73) Assignee: Lite-On It Corporation, Taipei (TW)

( * ) Notice: Subject to any disclaimer, the term of this patent is extended or adjusted under 35 U.S.C. 154(b) by 271 days.

(21) Appl. No.: 10/105,974

(22) Filed: Mar. 25, 2002

(65) Prior Publication Data

US 2003/0072249 A1 Apr. 17, 2003

(30) Foreign Application Priority Data

Oct. 12, 2001 (TW) ..................................... 90217407 U

(51) Int. Cl.⁷ ........................................... G11B 17/028
(52) U.S. Cl. ..................................................... 720/706
(58) Field of Search ................................ 369/264, 270, 369/271; 360/99.05, 99.12; 720/706, 707, 709, 710, 712, 713, 714

(56) References Cited

U.S. PATENT DOCUMENTS

| | | | | |
|---|---|---|---|---|
| 5,761,185 A | * | 6/1998 | Horiguchi et al. | .......... 369/270 |
| 6,108,294 A | * | 8/2000 | Iwanaga | ..................... 369/270 |
| 6,535,476 B1 | * | 3/2003 | Haga | ........................... 369/270 |
| 6,552,993 B2 | * | 4/2003 | Huang | ......................... 369/270 |
| 6,577,580 B2 | * | 6/2003 | Haga | ......................... 369/77.1 |
| 6,577,586 B1 | * | 6/2003 | Yang et al. | ................. 369/270 |

* cited by examiner

Primary Examiner—David L. Ometz
(74) Attorney, Agent, or Firm—Thomas, Kayden, Horstemeyer & Risley

(57) ABSTRACT

A reed-type clamp device. The reed-type clamp device comprises a main body, a rotating ring, a reed and a clamp. The rotating ring has a ring portion and a lever portion. The ring portion has a plurality of protrusions formed on the inner circumference of the ring portion. The rotating ring is disposed on the main body and rotates clockwise and counterclockwise. A plurality of swing arms are extended from the outer edge of the reed. The swing arm has an outer end fixed on the main body and a driving portion. The protrusions of the rotating ring touch the driving portions. The clamp is fitted in the reed. By rotating the rotating ring, the swing arms of the reed fixed on the main body are pushed upward or downward such that the clamp can be moved upward or downward.

17 Claims, 5 Drawing Sheets

REED-TYPE CLAMP DEVICE

BACKGROUND OF THE INVENTION

1. Field of the Invention

The present invention relates to a clamp device, and in particular to a reed-type clamp device for a CD-ROM drive.

2. Description of the Related Art

An optical media drive such as a CD-ROM drive is used to access the data stored in a compact disc (CD). A low-cost and of large capacity CD can be used to store varieties of data including music, images, programs and so on. A computer can not have the multi-media function and be installed with any application program without the CD-ROM drive. Thus, the CD-ROM drive plays a dominant role in the development of the computer industry.

With advances in optical accessing technique, the accessing speed of the CD-ROM drive is increased by high-speed rotation of the spindle motor disposed in the CD-ROM drive. After the central hole of the CD is positioned on the rotating disk of the spindle motor, a clamp device is required to fix the CD on the rotating disk of the spindle motor. The clamp device is required to effectively and easily perform the motions of fixing and releasing the CD.

The conventional clamp device of the CD-ROM drive is a stationary device. Thus, the spindle motor and the rotating disk can only move in the upward and downward direction. In addition, because the conventional clamp device requires large space, it is difficult to fit it in a thin CD-ROM drive.

Consequently, an object of the invention is to improve the structure of the conventional clamp device so as to provide a more compact and stable clamp device for a CD-ROM drive.

SUMMARY OF THE INVENTION

An object of the invention is to provide a reed-type clamp device for a CD-ROM drive. The reed-type clamp device comprises a main body; a rotating ring having a plurality of protrusions, the rotating ring disposed on the main body and rotating clockwise and counterclockwise; a reed having a plurality of swing arms extended therefrom, the swing arm having an outer end fixed on the main body and at least one driving portion, the protrusions of the rotating ring touching the driving portions, whereby the swing arms are pushed upward or downward while the rotating ring rotates; and a clamp disposed in the reed.

A detailed description will be given by the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE PREFERRED EMBODIMENT

Figure 1:
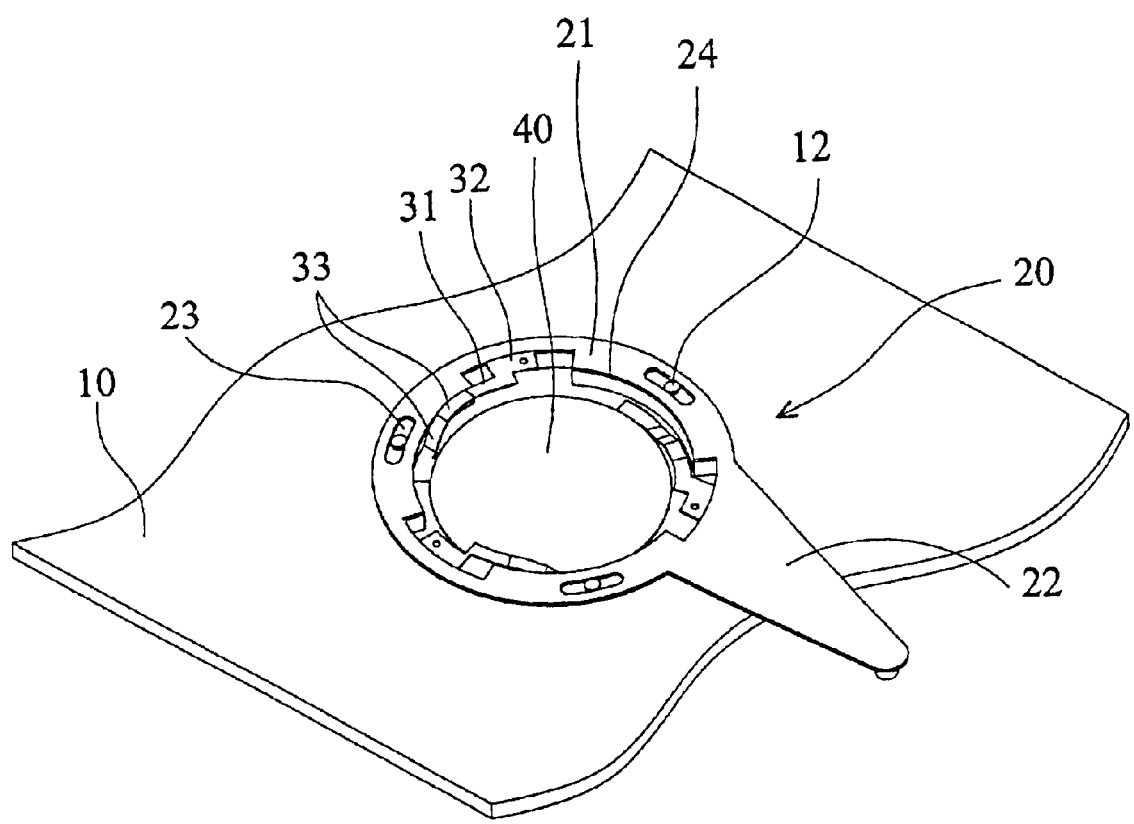
FIG. 1 is a perspective assembly view of the reed-type clamp device of the invention.
Figure 2:
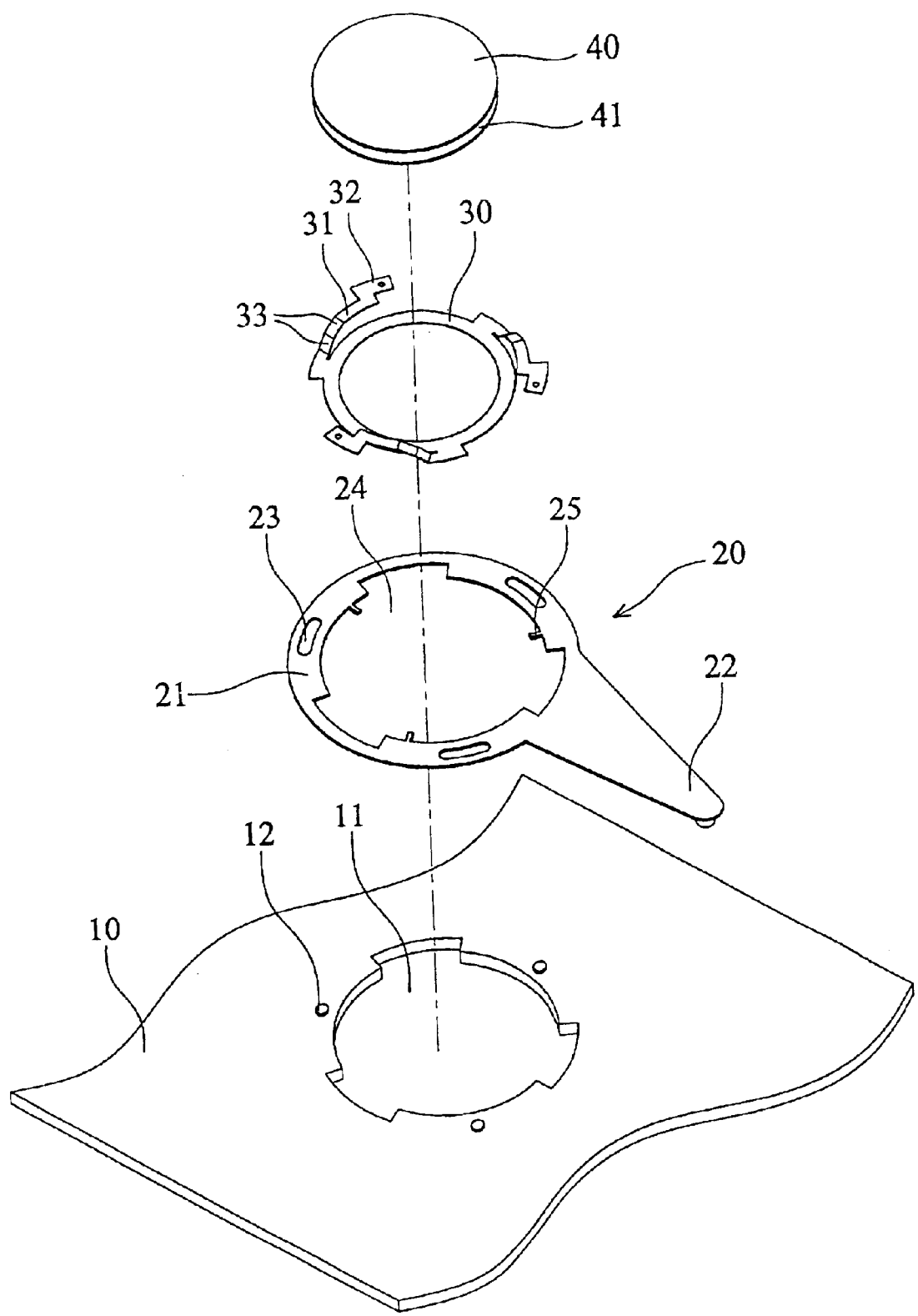
FIG. 2 is a perspective exploded view according to FIG. 1.

Referring to FIG. 1 and FIG. 2, the reed-type clamp device of the invention is disposed in a thin CD-ROM drive (not shown). The reed-type clamp device comprises a main body 10, a rotating ring 20, a reed 30 and a clamp 40. The main body 10 is punched from a metal plate and disposed above a data accessing assembly (not shown). The main body 10 has a first through hole 11. The clamp 40 can penetrate the first through hole 11. The first through hole 11 corresponds to a rotating disk (not shown) of a spindle motor (not shown) of the data accessing assembly. On the upper surface of the main body 10, three guiding pins 12 are disposed around the first through hole 11.

Figure 3:
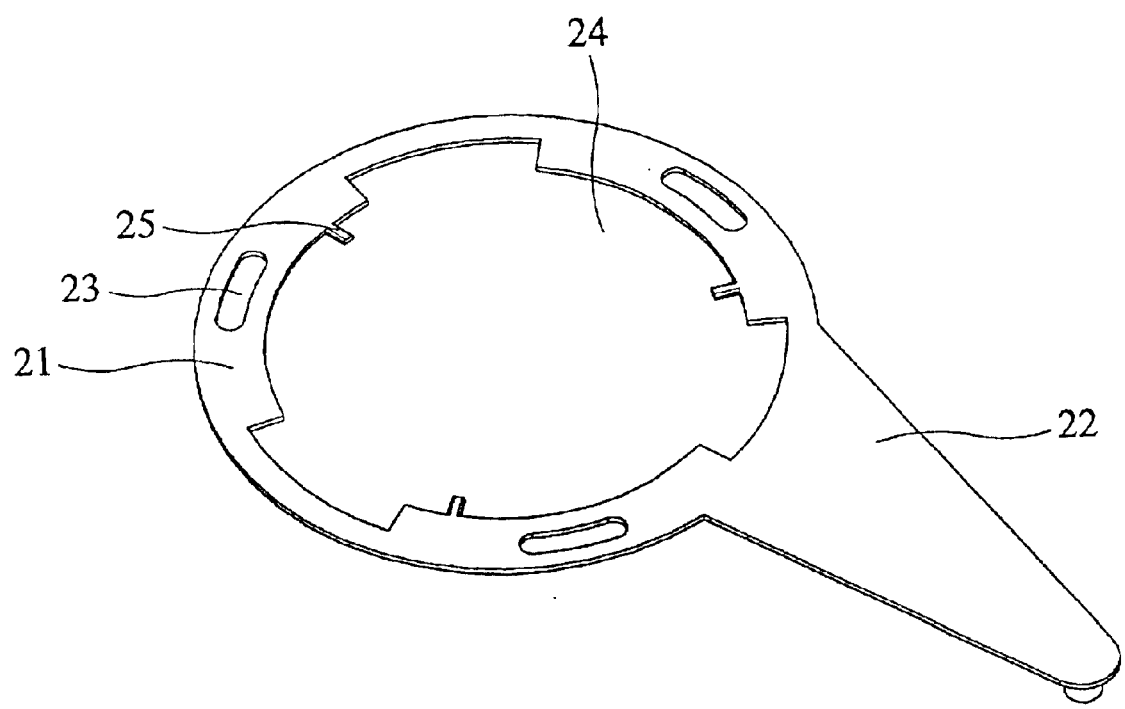
FIG. 3 is a perspective view of the rotating ring of the invention.

The rotating ring 20 comprises a ring porting 21 and a lever portion 22. As shown in FIG. 3, the ring portion 21 is a circular ring and has three guiding grooves 23. The guiding pins 12 of the main body 10 are fitted in the guiding grooves 23. A second through hole 24 is formed in the ring portion 21. Three protrusions 25 are formed on the circumference of the second through hole 24. The lever portion 22 protrudes from the outer circumference of the ring portion 21. The rotating ring 20 can rotate clockwise or counterclockwise by rotating the lever portion 22. The rotating ring 20 is disposed on the main body 10 in a rotating manner by fitting the guiding pins 12 in the guiding grooves 23.

Figure 4:
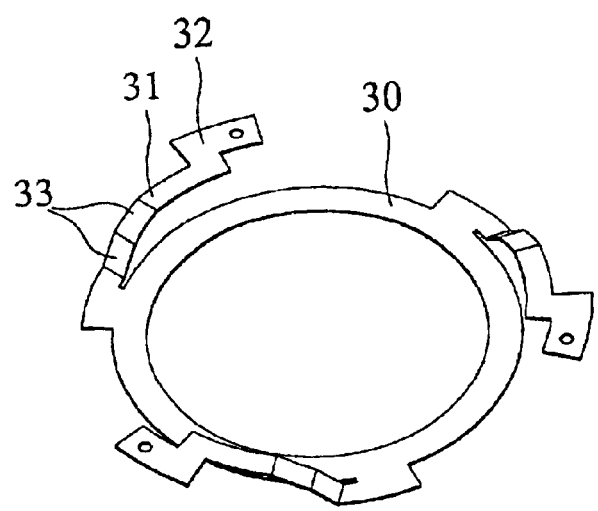
FIG. 4 is a perspective view of the reed of the invention.

Referring to FIG. 4, the reed 30 is punched from a metal plate having better elasticity. The reed 30 is a substantially circular ring and has three swing arms 31 extended from the outer edge of the reed 30. A fixing portion 32 is formed on the outer end of the swing arm 31 and fixed on the upper surface of the main body 10 by an engaging or riveting manner. The swing arm 31 has at least one driving portion 33 having a curved surface or a slant surface. The protrusion 25 of the rotating ring 20 touches the lower surface of the driving portion 33. Thus, the swing arm 31 can be pushed upward and downward when the rotating ring 20 rotates.

Figure 5:
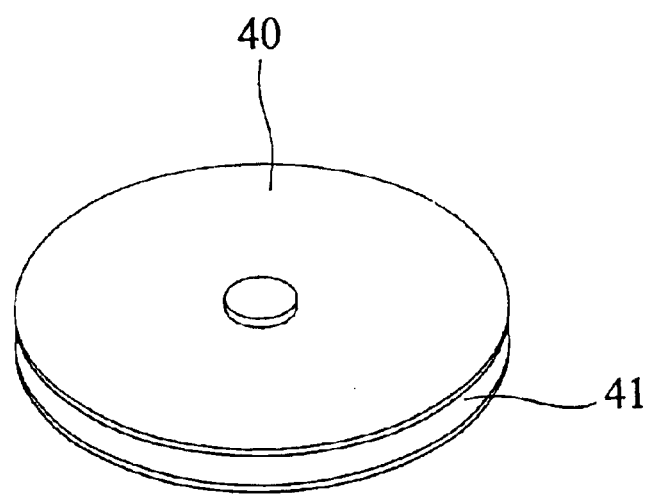
FIG. 5 is a perspective view of the clamp of the invention.
Figure 6:
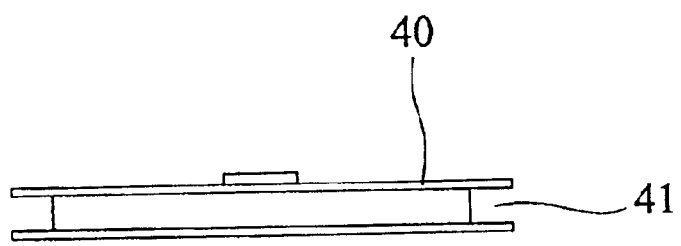
FIG. 6 is a front elevation view according to FIG. 5.

Referring to FIG. 5 and FIG. 6, the clamp 40 has a circular upper surface, a circular lower surface and an engaging groove 41 formed between the upper and lower surfaces. A magnet (not shown) is disposed on the upper or lower surface. The clamp 40 is fitted in the reed 30 to form the reed-type clamp structure by engaging the engaging groove 41 with the inner circumference of the reed 30.

Figure 7:
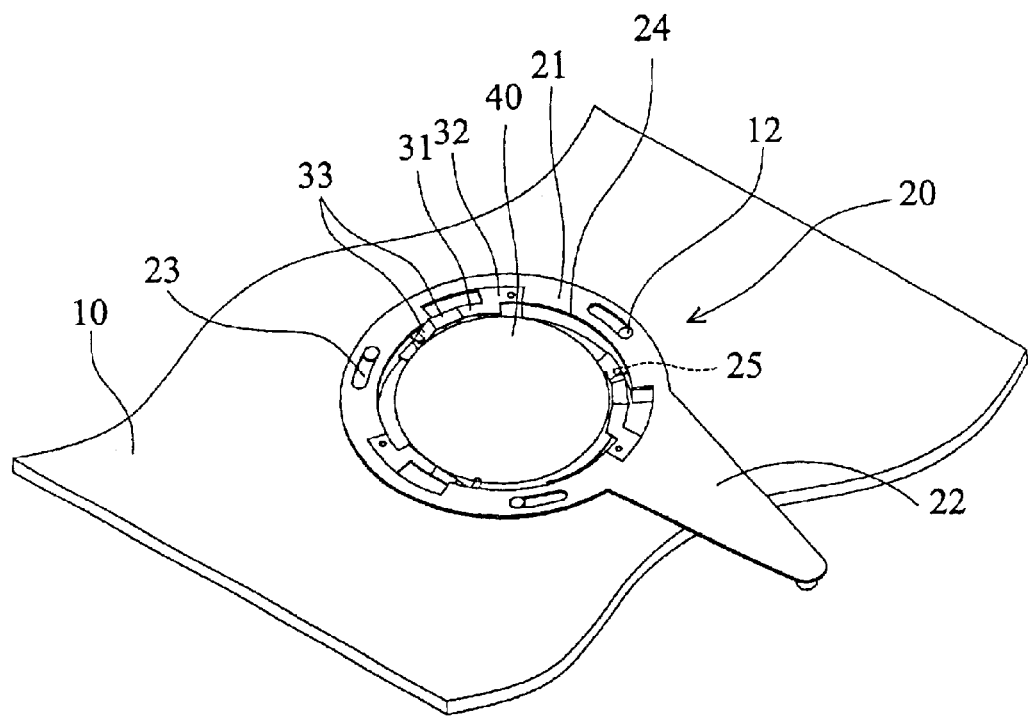
FIG. 7 shows the clamp moving upward.
Figure 8:
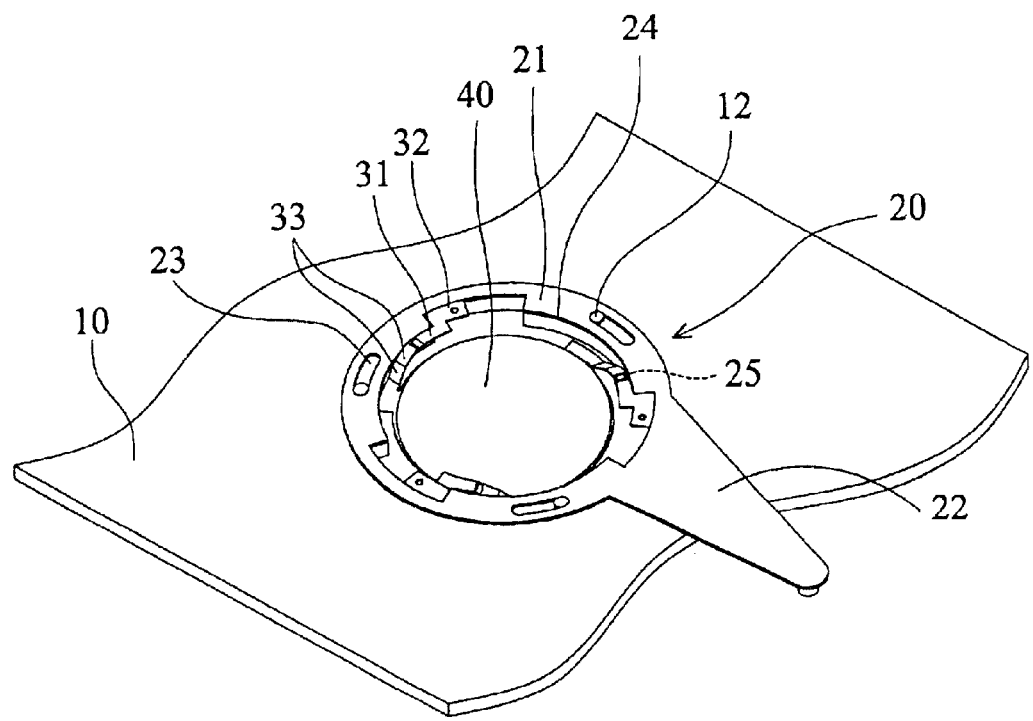
FIG. 8 shows the clamp moving downward.

Referring to FIG. 7 and FIG. 8, by rotating the rotating ring 20, the swing arms 31 of the reed 30 fixed on the main body 10 are pushed upward or downward such that the clamp 40 can be moved upward or downward. When the rotating ring 20 rotates counterclockwise, as shown in FIG. 7, the protrusions 25 of the rotating ring 20 push the driving portions 33 to make the swing arm 31 move upward. Thus, the clamp 40 can be moved upward and depart from the rotating disk of the spindle motor. On the other hand, when the rotating ring 20 rotates clockwise, as shown in FIG. 8, the protrusions 25 of the rotating ring 20 depart from the driving portions 33 to make the swing arm 31 move downward. Thus, the clamp 40 can be moved downward and attached to the rotating disk of the spindle motor by way of the first through hole 11. As the clamp 40 has a magnet disposed thereon, the clamp 40 can be attached to the rotating disk of the spindle motor by the magnetic force of the magnet when the clamp 40 comes down a certain level. Thus, the CD is fixed on the rotating disk.

As the reed-type clamp device of the invention has a simplified structure, it can be fitted in a small space and operated precisely. The reed-type clamp device converts the linear movement of the transmission device of the CD-ROM drive to the rotation movement by the rotating ring 20. The rotation movement results in the relative movement between the rotating ring 20 (movable component) and the reed 30 (fixed component), thus causing the clamp 40 to fix on or depart from the rotating disk. Preferably, the reed-type clamp device of the invention can be disposed in a thin CD-ROM drive.

While the invention has been described by way of example and in terms of the preferred embodiment, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A reed-type clamp device, comprising:
    a main body;
    a rotating ring having a plurality of protrusions, the rotating ring disposed on the main body and rotating clockwise and counterclockwise;
    a reed having a plurality of swing arms extended therefrom, each swing arm having an outer end fixed on the main body and at least one driving portion, the protrusions of the rotating ring touching the driving portions, whereby the swing arms are pushed upward or downward while the rotating ring rotates; and
    a clamp disposed in the reed.

2. The reed-type clamp device as claimed in claim 1, wherein the main body is disposed in a CD-ROM drive.

3. The reed-type clamp device as claimed in claim 1, wherein the main body has a first through hole, and the upper surface of the main body has a plurality of guiding pins disposed around the first through hole, and the rotating ring has a plurality of guiding grooves, the guiding pins fitted in the guiding grooves.

4. The reed-type clamp device as claimed in claim 1, wherein the rotating ring has a ring portion and a lever portion, the ring portion having a second through hole formed therein, the protrusions formed on the circumference of the second through hole.

5. The reed-type clamp device as claimed in claim 4, wherein the clamp has a magnet disposed thereon and an engaging groove formed therein, the engaging groove engaged with the inner circumference of the reed such that the clamp is fitted in the reed.

6. The reed-type clamp device as claimed in claim 1, wherein the driving portion of each swing arm of the reed has a curved surface.

7. The reed-type clamp device as claimed in claim 1, wherein the driving portion of each swing arm of the reed has a slant surface.

8. The reed-type clamp device as claimed in claim 1, wherein the outer end of each swing arm of the reed has a fixing portion fixed on the main body.

9. An optical media drive, comprising:
    a spindle motor;
    a rotating disk disposed on the spindle motor; and
    a reed-type clamp device disposed above the rotating disk, the reed-type clamp device having a main body, a rotating ring being disposed on the main body and having a plurality of protrusions, a reed having a plurality of swing arms extended therefrom, and a clamp disposed in the reed;
        wherein each swing arm having an outer end fixed on the main body and at least one driving portion, the protrusions of the rotating ring touching the driving portions of the reed, whereby the swing arms of the reed are pushed upward or downward while the rotating ring rotates.

10. The optical media drive as claimed in claim 9, wherein the optical media drive is a CD-ROM drive.

11. The optical media drive as claimed in claim 9, wherein the rotating ring rotates clockwise and counterclockwise.

12. The optical media drive as claimed in claim 9, wherein the main body has a first through hole, and the upper surface of the main body has a plurality of guiding pins disposed around the first through hole, and the rotating ring has a plurality of guiding grooves, the guiding pins fitted in the guiding grooves.

13. The optical media drive as claimed in claim 9, wherein the rotating ring has a ring portion and a lever portion, the ring portion having a second through hole formed therein, the protrusions formed on the circumference of the second through hole.

14. The optical media drive as claimed in claim 9, wherein the clamp has a magnet disposed thereon and an engaging groove formed therein, the engaging groove engaged with the inner circumference of the reed such that the clamp is fitted in the reed.

15. The optical media drive as claimed in claim 9, wherein the driving portion of each swing arm of the reed has a curved surface.

16. The optical media drive as claimed in claim 9, wherein the driving portion of each swing arm of the reed has a slant surface.

17. The optical media drive as claimed in claim 9, wherein the outer end of each swing arm of the reed has a fixing portion fixed on the main body.

* * * * *